(12) United States Patent
Onodera et al.

(10) Patent No.: US 11,512,233 B2
(45) Date of Patent: Nov. 29, 2022

(54) PROTECTIVE FILM

(71) Applicant: SUMITOMO BAKELITE CO., LTD., Shinagawa-ku (JP)

(72) Inventors: Kazufusa Onodera, Shinagawa-ku (JP); Hironari Inaba, Shinagawa-ku (JP)

(73) Assignee: SUMITOMO BAKELITE CO., LTD., Shinagawa-ku (JP)

( * ) Notice: Subject to any disclaimer, the term of this patent is extended or adjusted under 35 U.S.C. 154(b) by 0 days.

(21) Appl. No.: 17/040,358

(22) PCT Filed: Mar. 20, 2019

(86) PCT No.: PCT/JP2019/011834
§ 371 (c)(1),
(2) Date: Sep. 22, 2020

(87) PCT Pub. No.: WO2019/182047
PCT Pub. Date: Sep. 26, 2019

(65) Prior Publication Data
US 2021/0024782 A1  Jan. 28, 2021

(30) Foreign Application Priority Data
Mar. 23, 2018  (JP) ............................ JP2018-057300

(51) Int. Cl.
| | | |
|---|---|---|
| *C09J 7/24* | (2018.01) | |
| *C09J 123/06* | (2006.01) | |
| *C09J 133/08* | (2006.01) | |
| *C09J 133/10* | (2006.01) | |
| *C09J 153/02* | (2006.01) | |
| *C09J 123/12* | (2006.01) | |
| *C09J 123/04* | (2006.01) | |
| *B29C 48/08* | (2019.01) | |
| *B29C 48/07* | (2019.01) | |
| *B29C 48/21* | (2019.01) | |
| *B29C 51/14* | (2006.01) | |
| *G02B 1/14* | (2015.01) | |
| *G02B 5/30* | (2006.01) | |
| *B32B 7/12* | (2006.01) | |
| *B32B 23/08* | (2006.01) | |
| *B32B 27/08* | (2006.01) | |
| *B32B 27/34* | (2006.01) | |
| *C09J 7/38* | (2018.01) | |
| *C09J 7/29* | (2018.01) | |
| *B32B 27/36* | (2006.01) | |

(52) U.S. Cl.
CPC ............... *C09J 7/385* (2018.01); *B32B 7/12* (2013.01); *B32B 23/08* (2013.01); *B32B 27/08* (2013.01); *B32B 27/34* (2013.01); *B32B 27/365* (2013.01); *C09J 7/243* (2018.01); *C09J 7/29* (2018.01); *C09J 123/06* (2013.01); *C09J 133/08* (2013.01); *C09J 133/10* (2013.01); *C09J 153/02* (2013.01); *G02B 1/14* (2015.01); *C09J 2423/046* (2013.01); *C09J 2423/106* (2013.01); *C09J 2433/00* (2013.01); *C09J 2453/00* (2013.01)

(58) Field of Classification Search
None
See application file for complete search history.

(56) References Cited

U.S. PATENT DOCUMENTS

| | | | |
|---|---|---|---|
| 2011/0268978 A1 | 11/2011 | Watanabe et al. | |
| 2011/0281067 A1* | 11/2011 | Yoshida | ................ C09J 123/02 428/141 |
| 2015/0355395 A1 | 12/2015 | Kimura et al. | |
| 2016/0109622 A1 | 4/2016 | Yoshida et al. | |
| 2017/0343703 A1 | 11/2017 | Yoshida et al. | |

FOREIGN PATENT DOCUMENTS

| | | |
|---|---|---|
| CN | 105308485 A | 2/2016 |
| JP | 2003-145616 A | 5/2003 |
| JP | 2009-262423 A | 11/2009 |
| JP | 2013-124293 A | 6/2013 |
| JP | 2017-8205 A | 1/2017 |
| JP | 2017-81160 A | 5/2017 |
| WO | WO 2014/054700 A1 | 4/2014 |
| WO | WO 2014/115705 A1 | 7/2014 |
| WO | WO 2016/067937 A1 | 5/2016 |

OTHER PUBLICATIONS

International Search Report dated Jun. 11, 2019 in PCT/JP2019/011834 filed Mar. 20, 2019, 2 pages.

* cited by examiner

*Primary Examiner* — Sheeba Ahmed
(74) *Attorney, Agent, or Firm* — Oblon, McClelland, Maier & Neustadt, L.L.P.

(57) ABSTRACT

A protective film 10 of the present invention includes a base material layer and a pressure sensitive adhesive layer, and is used by being attached to a resin substrate 21 at the time of performing heat bending on the resin substrate 21. The pressure sensitive adhesive layer contains a polyolefin having a melting point of lower than 125° C. The base material layer has a first layer which contains a polyolefin having a melting point of 150° C. or higher, and a second layer which contains an adhesive resin. In a case of heating the protective film 100 having such a configuration, in a state of being interposed between two attaching substrates which are formed of polycarbonate, at 145° C. for 30 minutes, peeling off one attaching substrate on the side of the pressure sensitive adhesive layer at 25° C., and then viewing a surface of the one attaching substrate in a plan view, a residual ratio of an area where the pressure sensitive adhesive layer remains is 5% or less.

20 Claims, 2 Drawing Sheets

PROTECTIVE FILM

CROSS-REFERENCE TO RELATED APPLICATIONS

This application is a national stage application of International Application No. PCT/JP2019/011834, filed Mar. 20, 2019, which is based upon and claims the benefit of priority to Japanese Patent Application No. 2018-057300, filed Mar. 23, 2018. The entire contents of these applications are incorporated herein by reference.

TECHNICAL FIELD

The present invention relates to a protective film used by being attached to a resin substrate at the time of performing heat bending on the resin substrate while heating the resin substrate.

BACKGROUND ART

A lens for sunglasses provided with a resin substrate having a configuration in which both surfaces of a polarizer are coated with a coating layer formed of a polycarbonate resin, a polyamide resin, or a cellulose resin is exemplified. Such a lens for sunglasses is produced, for example, in the following manner. First, a protective film is attached to both surfaces of the resin substrate having a flat plate shape in a plan view. In this state, the resin substrate is punched into a predetermined shape such as a circular shape in a plan view. Thereafter, heat bending is performed on this resin substrate while heating the resin substrate. In addition, the protective film is peeled off from the resin substrate on which the heat bending has been performed. Thereafter, a polycarbonate layer is injection-molded on the concave surface of this resin substrate. In this manner, a lens for sunglasses is produced.

This protective film includes, for example, a base material and a pressure sensitive adhesive layer. Specifically, a protective film having a configuration in which a base material containing a polyolefin-based resin as a main material is attached to the resin substrate through a pressure sensitive adhesive layer containing, as a main material, polyethylene, an ethylene-propylene copolymer, and the like has been suggested (for example, see PTL 1).

However, the protective film having such a configuration can be attached to the resin substrate without being peeled off in a case of punching the resin substrate and in a case of performing heat bending, but has the following problems. That is, in a case of performing the heat bending of the resin substrate, unevenness (so-called orange peel) due to a mold used for the heat bending is formed on the surface of the resin substrate. Further, in a case of punching the resin substrate, in a cut surface of the resin substrate, which is formed by carrying out the punching, the pressure sensitive adhesive layer extends to the resin substrate side, which causes so-called whiskers. As a result, in a case of peeling off the protective film from the resin substrate, the pressure sensitive adhesive layer as whiskers remains on the cut surface of the resin substrate. For these reasons, there has been a problem that the yield of the lens for sunglasses to be produced is reduced.

Further, the same problem occurs not only in the lens for sunglasses described above but also in resin substrates such as a lens of goggles and a visor of helmets.

CITATION LIST

Patent Literature

[PTL 1] JP2003-145616A

SUMMARY OF INVENTION

Technical Problem

An object of the present invention is to provide a protective film in which, at the time of performing heat bending of the resin substrate, the heat bending can be performed without forming unevenness on a surface of the resin substrate, and which, in a case of punching the resin substrate and then peeling off the protective film from the resin substrate, can accurately suppress or prevent a pressure sensitive adhesive layer from remaining on a cut surface of the resin substrate, which is formed by carrying out the punching.

Solution to Problem

Such an object can be achieved by the present invention described in the following items (1) to (9).

(1) A protective film which is used by being attached to a resin substrate at the time of performing heat bending on the resin substrate while heating the resin substrate, the protective film including:
a base material layer; and
a pressure sensitive adhesive layer which is positioned between the base material layer and the resin substrate and is adhered to the resin substrate,
in which the pressure sensitive adhesive layer contains a polyolefin having a melting point of lower than 125° C. as a main material,
in which the base material layer is composed of a laminate having a first layer, which is positioned on a side opposite to the pressure sensitive adhesive layer and contains a polyolefin having a melting point of 150° C. or higher as a main material, and a second layer, which is positioned on a side facing the pressure sensitive adhesive layer and contains an adhesive resin as a main material, and
in which when heating the protective film at 145° C. for 30 minutes in a state that the protective film is being interposed between two attaching substrates which are formed of polycarbonate and have a dimension of 30 cm in length×30 cm in width×2.0 mm in thickness, peeling off the attaching substrate on the side of the pressure sensitive adhesive layer under the conditions of a temperature of 25° C., a peeling angle of 90°, and a pulling speed of 1,000 mm/min and then viewing a surface of the attaching substrate in a plan view, a residual ratio of an area where the pressure sensitive adhesive layer remains is 5% or less.

(2) The protective film according to (1),
in which a melt flow rate of the polyolefin contained in the pressure sensitive adhesive layer, which is measured under the conditions of a heating temperature of 230° C. and a load of 2.16 kgf in conformity with JIS K7210 is in a range of 0.5 g/10 min to 10.0 g/10 min.

(3) The protective film according to (1) or (2),
in which the pressure sensitive adhesive layer further contains an elastomer.

(4) The protective film according to (3),
in which the elastomer contained in the pressure sensitive adhesive layer includes a styrene-olefin-styrene block copolymer.

(5) The protective film according to any one of (1) to (4), in which the second layer contains an elastomer as the adhesive resin and a polyolefin having a melting point of 150° C. or higher.

(6) The protective film according to (5), in which the elastomer contained in the second layer includes a styrene-olefin-styrene block copolymer.

(7) The protective film according to any one of (1) to (6), in which a pair of the protective films are respectively attached to both surfaces of the resin substrate.

(8) The protective film according to any one of (1) to (7), in which a coating layer, which is composed of a single layer or a laminate having at least one layer selected from a polycarbonate resin layer, a polyamide resin layer, and a cellulose resin layer, is provided on one surface or the other surface of the resin substrate, or in which a pair of the coating layers are respectively provided on both surfaces of the resin substrate.

(9) The protective film according to any one of (1) to (8), in which the resin substrate is subjected to the heat bending by carrying out press molding or vacuum molding.

Advantageous Effects of Invention

According to the present invention, in a case of performing heat bending of the resin substrate, the heat bending can be performed without forming, on the surface of the resin substrate, unevenness (so-called orange peel) due to a mold used for the heat bending. Further, in a case of punching the resin substrate and then peeling off the protective film from the resin substrate, it is possible to accurately suppress or prevent a pressure sensitive adhesive layer from remaining on a cut surface of the resin substrate, which is formed by carrying out the punching.

Accordingly, in a case where the resin substrate is applied to, for example, a resin substrate of a lens for sunglasses, the lens for sunglasses can be produced with high yield.

DESCRIPTION OF EMBODIMENTS

Hereinafter, a protective film of the present invention will be described in detail based on suitable embodiments illustrated in the accompanying drawings.

The protective film of the present invention is a protective film used by being attached to a resin substrate at the time of performing heat bending on the resin substrate while heating the resin substrate. The protective film has a base material layer and a pressure sensitive adhesive layer which is positioned between the base material layer and the resin substrate and is adhered to the resin substrate. The pressure sensitive adhesive layer contains a polyolefin having a melting point of lower than 125° C. as a main material. The base material layer is composed of a laminate having a first layer, which is positioned on a side opposite to the pressure sensitive adhesive layer and contains a polyolefin having a melting point of 150° C. or higher as a main material, and a second layer, which is positioned on a side of the pressure sensitive adhesive layer and contains an adhesive resin as a main material. Here, in a case of heating the protective film, in a state of being interposed between two attaching substrates which are formed of polycarbonate and have a dimension of 30 cm in length×30 cm in width×2.0 mm in thickness, at 145° C. for 30 minutes, peeling off one attaching substrate on the side of the pressure sensitive adhesive layer at 25° C., a peeling angle of 90°, and a pulling speed of 1,000 mm/min, and then viewing a surface of the one attaching substrate in a plan view, a residual ratio of an area where the pressure sensitive adhesive layer remains is 5% or less.

With such a configuration of the protective film, in a case of performing heat bending of the resin substrate, the heat bending can be performed without forming, on the surface of the resin substrate, unevenness (so-called orange peel) due to a mold used for the heat bending. Further, in a case of punching the resin substrate and then peeling off the protective film from the resin substrate, it is possible to accurately suppress or prevent a pressure sensitive adhesive layer from remaining on a cut surface of the resin substrate, which is formed by carrying out the punching. Accordingly, in a case where the resin substrate is applied to, for example, a resin substrate of a lens for sunglasses, the lens for sunglasses can be produced with high yield.

Hereinafter, a method of producing a lens for sunglasses using the protective film of the present invention will be described prior to describing the protective film of the present invention.

<Method of Producing Lens for Sunglasses>

Figure 1:
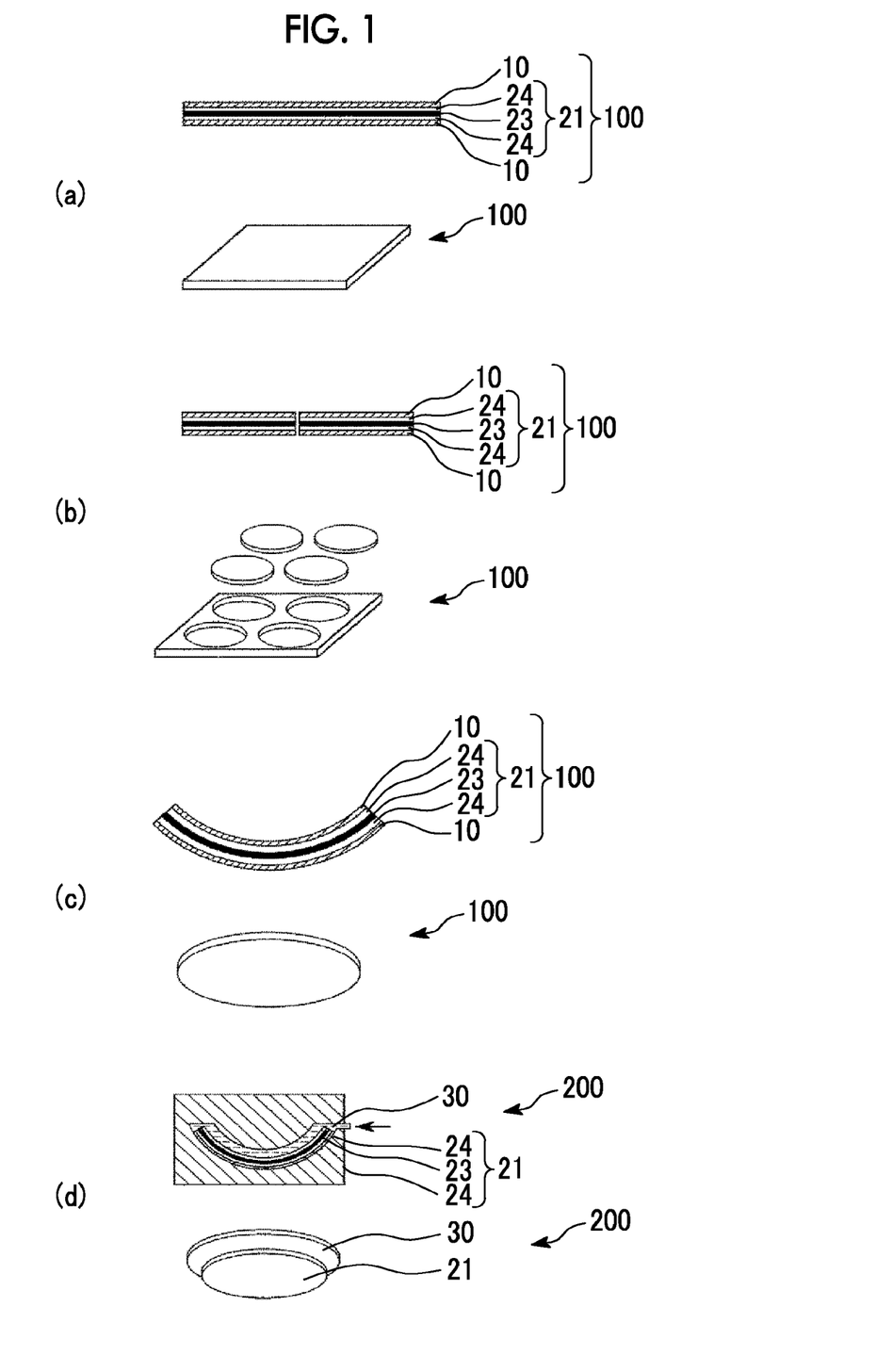
FIG. 1 shows schematic views for describing a method of producing a lens for sunglasses using a protective film.

FIG. 1 shows schematic views for describing a method of producing a lens for sunglasses using the protective film. Hereinafter, for convenience of description, the upper side of FIG. 1 will be referred to as "upper" and the lower side thereof will be referred to as "lower".

Hereinafter, each step in the method of producing a lens for sunglasses will be described in detail.

[1] First, a resin substrate 21 having a flat plate shape is prepared, and a protective film 10 (masking tape) is attached to both surfaces of the resin substrate 21, thereby obtaining a laminate 100 in which the protective film 10 is attached to the both surfaces of the resin substrate 21 (see (a) of FIG. 1).

In the present embodiment, the resin substrate 21 including a polarizer 23 and a coating layer 24 is prepared. The polarizer 23 functions as an optical element that extracts linearly polarized light having a polarization surface in one predetermined direction from unpolarized natural light. Both surfaces of the polarizer 23 are coated with the coating layer 24. Further, the coating layer 24 of the resin substrate 21 is composed of a single layer or a laminate having at least one layer selected from a polycarbonate resin layer, a polyamide resin layer, and a cellulose resin layer such as triacetyl cellulose. Further, in addition to the case where the coating layer 24 is formed on the both surfaces (surfaces on both sides) of the polarizer 23, the coating layer 24 may be formed on any of the upper surface (one surface) or the lower surface (the other surface).

[2] Next, as illustrated in (b) of FIG. 1, the prepared laminate 100, that is, the resin substrate 21 is punched in the thickness direction in a state where the protective film 10 is attached to the both surfaces of the resin substrate 21. In this manner, the laminate 100 is formed into a circular shape in a plan view.

[3] Next, as illustrated in (c) of FIG. 1, the laminate 100 which has been formed into a circular shape is subjected to heat bending while being heated.

The heat bending is typically performed by press molding or vacuum molding (REMA molding) using a mold.

As described above, in the present embodiment, the resin substrate 21 includes the coating layer 24, and the coating layer 24 is composed of a single layer or a laminate having at least one layer selected from a polycarbonate resin layer, a polyamide resin layer, and a cellulose resin layer. Accordingly, the heating temperature (molding temperature) of the laminate 100 (resin substrate 21) at the time of performing the heat bending is set to be preferably in a range of 110° C. to 150° C. and more preferably in a range of 140° C. to 150° C. in consideration of the melting or softening temperature of the coating layer 24. By setting the heating temperature to be within the above-described range, the resin substrate 21 can be reliably heat-bended in a state where the resin substrate 21 is softened or melted while preventing change in quality and deterioration of the resin substrate 21.

[4] Next, as illustrated in (d) of FIG. 1, the protective film 10 is peeled off from the heat-bended resin substrate 21, that is, the heat-bended laminate 100, and a polycarbonate layer 30 formed of a polycarbonate resin is injection-molded on a concave surface of this resin substrate 21. Further, a polyamide layer formed of a polyamide resin may be formed on the concave surface of the resin substrate 21 in place of the polycarbonate layer 30.

In this manner, a lens 200 for sunglasses including the heat-bended resin substrate 21 is produced.

Figure 2:
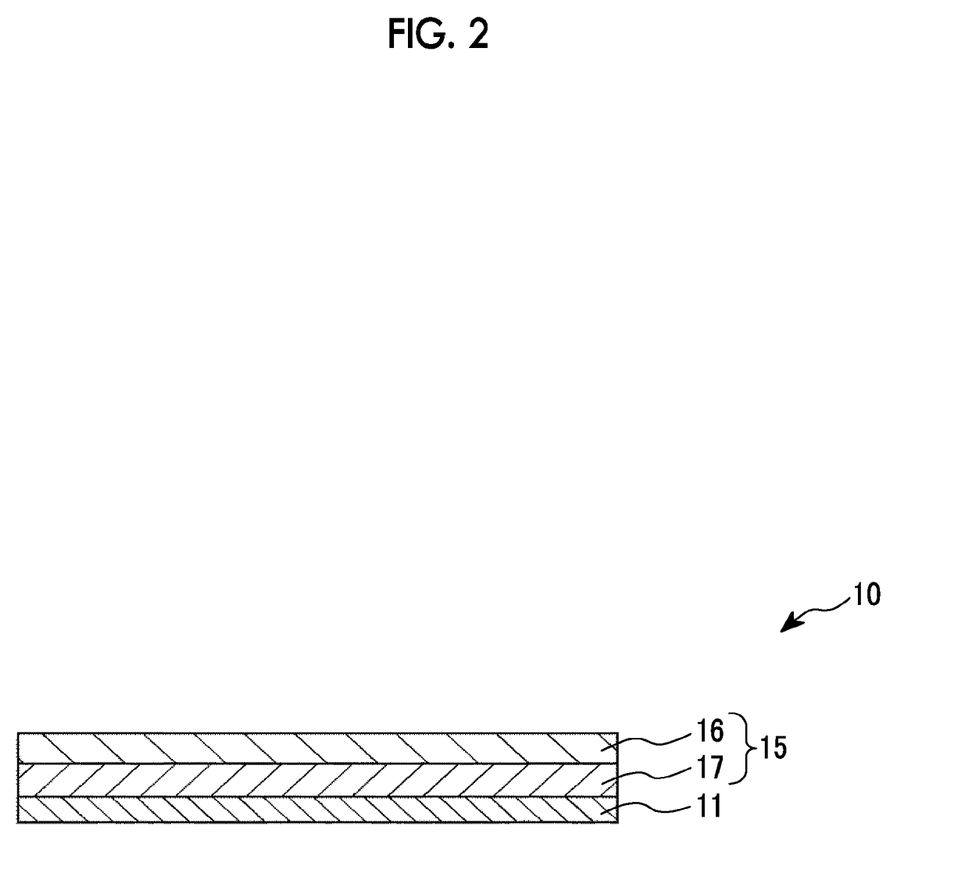
FIG. 2 shows a longitudinal cross-sectional view illustrating a suitable embodiment of the protective film of the present invention.

Here, in the method of producing a lens for sunglasses described above, particularly in the step [2], in a case of punching the resin substrate 21, at a cut surface (end surface) of the resin substrate 21, which is formed by carrying out the punching, a pressure sensitive adhesive layer 11 shown in FIG. 2 extends to a side of the resin substrate 21, which may cause so-called whiskers. In a case of, in the step [4], peeling off the protective film 10 from the resin substrate 21 in a state where whiskers are formed, the pressure sensitive adhesive layer 11 as the whiskers remains on the cut surface of the resin substrate 21. Accordingly, there has been a problem that the yield of the lens 200 for sunglasses to be produced is reduced.

On the contrary, in the present invention, the protective film 10 has the following configurations and characteristics. That is, as illustrated in FIG. 2, the protective film 10 has a base material layer 15 and a pressure sensitive adhesive layer 11 which is positioned between the base material layer 15 and the resin substrate 21 and adheres to the resin substrate 21. The pressure sensitive adhesive layer 11 contains a polyolefin having a melting point of lower than 125° C. as a main material. The base material layer 15 is composed of a laminate having a first layer 16, which is positioned on a side opposite to the pressure sensitive adhesive layer 11 and contains a polyolefin having a melting point of 150° C. or higher as a main material, and a second layer 17, which is positioned on a side of the pressure sensitive adhesive layer 11 and contains an adhesive resin as a main material. In a case of heating the protective film 10 having such a configuration, in a state of being interposed between two attaching substrates which are formed of polycarbonate and have a dimension of 30 cm in length×30 cm in width×2.0 mm in thickness, at 145° C. for 30 minutes, peeling off one attaching substrate on the side of the pressure sensitive adhesive layer 11 at 25° C., a peeling angle of 90°, and a pulling speed of 1,000 mm/min, and then viewing a surface of the one attaching substrate in a plan view, a residual ratio of an area where the pressure sensitive adhesive layer 11 remains is 5% or less.

The protective film 10 in which the residual ratio described above is 5% or less has excellent adhesiveness between the pressure sensitive adhesive layer 11 and the base material layer 15, and by applying to the production of the lens 200 for sunglasses, exhibits excellent peelability between the pressure sensitive adhesive layer 11 and the resin substrate 21, in a case of peeling off, in the step [4], the protective film 10 from the resin substrate 21.

Accordingly, in a case of punching the resin substrate 21 in the step [2], the following effect is exhibited even in a case where, in the cut surface of the resin substrate 21, which is formed by carrying out the punching, the pressure sensitive adhesive layer 11 extends to the side of the resin substrate 21, thereby forming the whiskers. That is, in a case of peeling off, in the step [4], the protective film 10 from the resin substrate 21, it is possible to peel off the protective film 10 (pressure sensitive adhesive layer 11) from the resin substrate 21 in a state of accurately suppressing or preventing the whiskers from remaining on the cut surface of the resin substrate 21. Therefore, the yield of the lens 200 for sunglasses can be improved. Hereinafter, the protective film 10 will be described in detail.

<Protective Film 10>

FIG. 2 is a longitudinal cross-sectional view illustrating a suitable embodiment of the protective film of the present invention. Hereinafter, for convenience of description, the upper side of FIG. 2 will be referred to as "upper" and the lower side thereof will be referred to as "lower".

In the present invention, the protective film 10 has the base material layer 15 and the pressure sensitive adhesive layer 11 which is positioned between the base material layer 15 and the resin substrate 21 and adheres (is bonded) to the resin substrate 21. As illustrated in FIG. 2, the base material layer 15 has the first layer 16 which is positioned on the side opposite to the pressure sensitive adhesive layer 11, that is, on a molding die side and the second layer 17 which is positioned on the pressure sensitive adhesive layer 11 side, that is, on the resin substrate 21 side.

Hereinafter, each of these layers will be described in detail.

«Pressure Sensitive Adhesive Layer 11»

The pressure sensitive adhesive layer 11 is positioned (interposed) between the base material layer 15 and the resin substrate 21 and adheres to the resin substrate 21. In this manner, the pressure sensitive adhesive layer 11 has a function of bonding the base material layer 15 to the resin substrate 21.

In the present invention, as described above, the pressure sensitive adhesive layer 11 contains a polyolefin having a melting point of lower than 125° C. as a main material.

As described above, since the pressure sensitive adhesive layer 11 contains a polyolefin having a melting point of lower than 125° C. as a main material, excellent adhesiveness can be imparted between the pressure sensitive adhesive layer 11 and the resin substrate 21. Accordingly, it is possible to perform the punching and heat bending of the resin substrate 21 in the step [2] and step [3] without peeling the protective film 10 off from the resin substrate 21.

Specifically, the protective film 10 is attached to the coating layer 24 to obtain a laminate. Thereafter, a peel strength $T_1$ between the coating layer 24 and the protective film 10, which is measured after the laminate is stored under a temperature condition of 50° C. for 12 hr in conformity with JIS C-6481:1996, and a peel strength $T_2$ between the coating layer 24 and the protective film 10, which is measured after the laminate is stored under a temperature condition of 150° C. for 5 min in conformity with JIS C-6481:1996, are respectively preferably in a range of 0.05 N/25 mm to 3.0 N/25 mm, more preferably in a range of 0.10 N/25 mm to 1.5 N/25 mm, and still more preferably in a range of 0.15 N/25 mm to 0.5 N/25 mm. By setting the peel strength $T_1$ and the peel strength $T_2$, after the laminate is stored respectively under a temperature condition of 50° C. for 12 hr and under a temperature condition of 150° C. for 5 min, to be within the above-described range, the punching and heat bending of the resin substrate 21 in the step [2] and step [3] can be performed without peeling the protective film 10 off from the resin substrate 21, and peeling of the protective film 10 off from the resin substrate 21 in step [4] can be performed even in a case where the protective film 10 has undergone heat history resulting from the heat bending in the step [3].

Further, since the pressure sensitive adhesive layer 11 contains a polyolefin having a melting point of lower than 125° C. as a main material, the pressure sensitive adhesive layer 11 can be in a softened or melted state at the time of performing the heat bending in the step [3]. In this manner, it is possible to impart a function as a cushion layer between the mold used in a case of the heat bending and the resin substrate 21 to the pressure sensitive adhesive layer 11. Accordingly, it is possible to accurately suppress or prevent the unevenness (so-called orange peel) due to the mold from being formed on the surface of the resin substrate 21.

Specifically, the melt flow rate (MFR) of the polyolefin having a melting point of lower than 125° C., which is measured under conditions of a heating temperature of 230° C. and a load of 2.16 kgf in conformity with JIS K7210, is preferably in a range of 0.5 g/10 min to 10.0 g/10 min, more preferably in a range of 1.0 g/10 min to 5.0 g/10 min, and still more preferably in a range of 2.0 g/10 min to 3.5 g/10 min. In this manner, the pressure sensitive adhesive layer 11 can exhibit an excellent function as a cushion layer.

In addition, the polyolefin having a melting point of lower than 125° C. is not particularly limited, examples thereof include polyolefins of a polypropylene homopolymer, a polyethylene homopolymer, a propylene-ethylene copolymer, an ethylene-vinyl acetate copolymer, an ethylene-ethyl acrylate copolymer, an ethylene-methyl methacrylate copolymer, and the like, which have a melting point of lower than 125° C., and these may be used alone or in combination of two or more kinds thereof. Among these, linear low-density polyethylene (LLDPE) having a melting point of lower than 125° C. is preferable. In this manner, it is possible to easily and inexpensively obtain a polyolefin having a melting point of lower than 125° C. In addition, it is possible to impart transparency to the pressure sensitive adhesive layer 11.

Accordingly, in a case where the base material layer 15 also has transparency, the protective film 10 can have transparency. Therefore, in a case of, in the step [1], attaching the protective film 10 to the resin substrate 21, it is possible to visually confirm whether dirt such as dust is present between the protective film 10 and the resin substrate 21. Accordingly, it is possible to reliably prevent a laminate 100 having the dirt therebetween from being transitioned to the step [2] and the subsequent steps. As the result, the yield of a lens 200 for sunglasses to be obtained can be improved.

Further, the copolymer may be either a block copolymer or a random copolymer.

In addition, it is sufficient that the melting point of the polyolefin is lower than 125° C., but the melting point of the polyolefin is preferably in a range of 100° C. or higher and lower than 125° C. In this manner, the effects obtained by setting the melting point of the polyolefin to be lower than 125° C. can be exhibited more significantly.

In addition, it is preferable that the pressure sensitive adhesive layer 11 contains an elastomer in addition to the polyolefin having a melting point of lower than 125° C. In a case where the pressure sensitive adhesive layer 11 contains an elastomer as described above, the pressure sensitive adhesive layer 11 exhibits excellent adhesiveness to the resin substrate 21. Accordingly, at the time of performing the punching and heat bending of the resin substrate 21 in the step [2] and step [3], it is possible to accurately suppress or prevent the protective film 10 from being peeled (released) from the resin substrate 21.

The elastomer is not particularly limited, and examples thereof include an α-olefin/polyethylene copolymer elastomer, an ethylene-propylene copolymer (EPR) having an EPR phase (rubber phase), an α-olefin/polypropylene copolymer elastomer such as an ethylene-propylene-diene terpolymer (EPDM), and a styrene block elastomer. Among these, a styrene block elastomer is preferable, and a styrene-olefin-styrene block copolymer elastomer is particularly preferable. As described above, in a case where an elastomer containing styrene is used as a monomer component, it is possible to accurately suppress or prevent adhesive residues from being generated on the resin substrate 21 in the step [4]. Further, examples of the α-olefin include ethylene, propylene, 1-hexene, 2-methyl-1,3-butadiene, 4-methyl-1-pentene, 1-octene, 1-butene, 1-pentene, and 1-heptene.

In this case, the content of the styrene in the elastomer is preferably 25 wt % or less and more preferably in a range of 5 wt % to 15 wt %. In this manner, it is possible to accurately suppress or prevent an increase in hardness of the pressure sensitive adhesive layer 11 caused by an increase in content of the styrene. Accordingly, it is possible to reliably impart the function as a cushion layer to the pressure sensitive adhesive layer 11 while reliably maintaining the adhesive force of the pressure sensitive adhesive layer 11 to the resin substrate 21 (coating layer 24).

Further, examples of the styrene-olefin-styrene block copolymer include a styrene-isobutylene-styrene block copolymer (SIBS), a styrene-ethylene-butylene-styrene block copolymer (SEBS), a styrene-butadiene-styrene block copolymer (SBS), and a styrene-isoprene-styrene copolymer (SIS). Among these, a styrene-ethylene-butylene-styrene block copolymer (SEBS) or a styrene-isoprene-styrene copolymer (SIS) is preferable. In a case where SEBS or SIS is selected as the styrene-olefin-styrene block copolymer, the content of the styrene in the elastomer can be easily set to 25 wt % or less, and the above-described effects can be reliably obtained.

Preferred specific examples of the elastomer, other than the styrene-olefin-styrene block copolymer, include a hydrogenated styrene-butadiene random copolymer (HSBR), an ethylene-propylene copolymer (EPR) having an EPR phase (rubber phase), an ethylene-propylene-diene terpolymer (EPDM), and a styrene-ethylene-butylene-ethylene block copolymer (SEBC). Even in a case where these elastomers are used, the same effect in a case where SEBS or SIS is selected can be obtained.

The content of the elastomer in the pressure sensitive adhesive layer 11 is not particularly limited, but is preferably in a range of 1 wt % to 30 wt % and more preferably in a range of 5 wt % to 15 wt %.

In addition, the melting point of the pressure sensitive adhesive layer 11 is preferably lower than 125° C. and more preferably in a range of 85° C. to 100° C. In this manner, the effects obtained by setting the melting point of the polyolefin to be lower than 125° C. can be exhibited more reliably.

In the present specification, the melting point of each layer which constitutes the protective film 10 including the pressure sensitive adhesive layer 11 is acquired by multiplying, by the ratio of each constituent material, the melting point (the peak temperature obtained by DSC measurement) of each constituent material contained in each layer and summing the obtained values, and the acquired value is defined as the melting point.

Further, the average thickness of the pressure sensitive adhesive layer 11 is preferably in a range of 5 µm to 40 µm and more preferably in a range of 5 µm to 20 µm. In this manner, the above-described functions as the pressure sensitive adhesive layer 11 can be reliably exhibited.

«Base Material Layer 15»

The base material layer 15 is bonded to the resin substrate 21 (coating layer 24) through the pressure sensitive adhesive layer 11. The base material layer 15 functions as a functional layer (protective layer) that protects (masks) the resin substrate 21 in a case of the punching and heat bending of the resin substrate 21 in the step [2] and step [3]. In addition, the base material layer 15 also functions as a protective layer (functional layer) for peeling (releasing) the resin substrate 21 (protective film 10) off from a mold used for heat bending after the heat bending in the step [3].

In addition, in the step [4], in a case of peeling off the protective film 10 from the heat-bended resin substrate 21, the base material layer 15 can exhibit excellent adhesiveness to the pressure sensitive adhesive layer 11 without peeling between the base material layer 15 and the pressure sensitive adhesive layer 11.

In the present invention, as illustrated in FIG. 2, in order to allow the base material layer 15 to exhibit these functions, the base material layer 15 is composed of a laminate having the first layer 16 which is positioned on the side opposite to the pressure sensitive adhesive layer 11, that is, on a molding die side and the second layer 17 which is positioned on the pressure sensitive adhesive layer 11 side, that is, on the resin substrate 21 side.

Hereinafter, the first layer 16 and the second layer 17 will be described.

«First Layer 16»

The first layer 16 is positioned on the side opposite to the pressure sensitive adhesive layer 11, and functions as an outermost layer for protecting (masking) the resin substrate 21 in a case of the punching and heat bending of the resin substrate 21 in the step [2] and step [3].

The melting point of the first layer 16 is set from the following viewpoints. For the purpose of maintaining excellent releasability from the molding die after the heat bending in the step [3], that is, allowing the first layer 16 not to adhere to the molding die (mold), the melting point of the first layer 16 is preferably 150° C. or higher and more preferably in a range of 155° C. to 170° C. Here, as described above, the heating temperature of the coating layer 24 (resin substrate 21) in a case of the heat bending in the step [3] is set to be preferably in a range of 110° C. to 150° C. Accordingly, by setting the melting point of the first layer 16 as described above, it is possible to reliably prevent the first layer 16 from being melted or softened in a case of the heat bending in the step [3]. Therefore, it is possible to reliably release the laminate 100 from the molding die after the heat bending in the step [3].

In the present invention, the first layer 16 contains, as a main material, a polyolefin having a melting point of 150° C. or higher, preferably 155° C. to 170° C. In this manner, the melting point of the first layer 16 can relatively easily be set to 150° C. or higher. Accordingly, it is possible to maintain excellent releasability of the laminate 100 from the molding die after the heat bending in the step [3].

In addition, in a case where the second layer 17 described later is also configured to contain a polyolefin of 150° C. or higher, the adhesiveness between the first layer 16 and the second layer 17 can be further improved. Accordingly, in the step [4], in a case of peeling off the protective film 10 from the heat-bended resin substrate 21, it is possible to accurately suppress or prevent peeling between the first layer 16 and the second layer 17.

In addition, the polyolefin having a melting point of 150° C. or higher is not particularly limited, examples thereof include polyolefins of a polypropylene homopolymer, a polyethylene homopolymer, a propylene-ethylene copolymer, an ethylene-vinyl acetate copolymer, an ethylene-ethyl acrylate copolymer, an ethylene-methyl methacrylate copolymer, and the like, which have a melting point of 150° C. or higher. These may be used alone or in combination of two or more kinds thereof. Among these, a polypropylene homopolymer having a melting point of 150° C. or higher is preferable. In this manner, it is possible to easily and inexpensively obtain a polyolefin having a melting point of 150° C. or higher. In addition, it is possible to impart transparency to the first layer 16. Accordingly, in a case where the second layer 17 and the pressure sensitive adhesive layer 11 also have transparency, the protective film 10 can have transparency. Therefore, in a case of, in the step [1], attaching the protective film 10 to the resin substrate 21, it is possible to visually confirm whether dirt such as dust is present between the protective film 10 and the resin substrate 21. Accordingly, it is possible to reliably prevent a laminate 100 having the dirt therebetween from being transitioned to the step [2] and the subsequent steps. As the result, the yield of a lens 200 for sunglasses to be obtained can be improved.

Further, the copolymer maybe either a block copolymer or a random copolymer.

Further, the average thickness of the first layer 16 is preferably in a range of 10 µm to 50 µm and more preferably in a range of 15 µm to 35 µm. In this manner, the above-described functions as the first layer 16 can be reliably exhibited.

«Second Layer 17»

The second layer 17 is positioned on the side of the pressure sensitive adhesive layer 11, that is, the resin substrate 21 side and functions as an intermediate layer positioned between the pressure sensitive adhesive layer 11 and the first layer 16.

In the present invention, the second layer 17 contains an adhesive resin as a main material. In this manner, in a case of heating the protective film 10 having such a configuration, in a state of being interposed between two attaching substrates which are formed of polycarbonate and have a dimension of 30 cm in length×30 cm in width×2.0 mm in thickness, at 145° C. for 30 minutes, peeling off one attaching substrate on the side of the pressure sensitive adhesive layer 11 at 25° C., a peeling angle of 90°, and a pulling speed of 1,000 mm/min, and then viewing a surface of the one attaching substrate in a plan view, the residual ratio of an area where the pressure sensitive adhesive layer 11 remains is set to be 5% or less. Accordingly, in the step [4], in a case of peeling off the protective film 10 from the resin substrate 21, peeling between the pressure sensitive adhesive layer 11 and the second layer 17 and between the first layer 16 and the second layer 17 is accurately suppressed or prevented. Therefore, in a case of punching the resin substrate 21 in the step [2], the following effect is exhibited even in a case where, in the cut surface of the resin substrate 21, which is formed by carrying out the punching, the pressure sensitive adhesive layer 11 extends to the side of the resin substrate 21, thereby forming the whiskers. That is, it is possible to peel off the protective film 10 (pressure sensitive adhesive layer 11) from the resin substrate 21 in a state of accurately suppressing or preventing the whiskers from remaining on the cut surface of the resin substrate 21.

It is sufficient that the residual ratio is 5% or less, but the residual ratio is preferably 3% or less and more preferably in a range of 0% to 1%. In this manner, the above-described effects can be exhibited more significantly.

As described above, the second layer 17 contains an adhesive resin as a constituent material. In this regard, in the present specification, the adhesive resin alone refers to a resin having adhesion. That is, as long as the residual ratio can be set to be 5% or less by containing the adhesive resin in the second layer 17, the adhesive resin may be any resin material.

Specific examples of the adhesive resin include an olefin-based material, an elastomer, an acrylic resin, and a polyurethane resin. Among these, an olefin-based material or an elastomer is preferable, and in a case where the pressure sensitive adhesive layer 11 contains an elastomer, an elastomer is particularly preferable. In this manner, adhesiveness between the pressure sensitive adhesive layer 11 and the second layer 17 can be improved, and it is possible to accurately suppress or prevent peeling between the pressure sensitive adhesive layer 11 and the second layer 17. Accordingly, the residual ratio can be reliably set to be 5% or less.

Examples of the olefin-based material include an ethylene-vinyl acetate copolymer (EVA), an ethylene-maleic anhydride copolymer, an ethylene-methyl methacrylate copolymer (EMMA), an ethylene-methyl acrylate copolymer (EMA), an ethylene-methacrylic acid copolymer (EMAA), an ethylene-acrylic acid copolymer (EAA), an ethylene-ethylacrylic acid copolymer (EEA), and an ethylene-methacrylate-glycidyl acrylate terpolymer, and include grafted products obtained by grafting, onto various polyolefins, a monobasic unsaturated fatty acid such as acrylic acid and methacrylic acid, a dibasic unsaturated fatty acid such as maleic acid, fumaric acid, and itaconic acid, or an anhydride thereof, and functional group-introduced products obtained by introducing, into various polyolefins, a functional group such as a carboxylic acid group, a hydroxyl group, an amino group, an acid anhydride group, an oxazoline group, and an epoxy group. These may be used alone or in combination of two or more kinds thereof. Examples of the grafted product include a maleic acid-grafted EVA and a maleic acid-grafted ethylene-a-olefin copolymer.

Further, as the elastomer, the same elastomer as the above-described elastomer contained in the pressure sensitive adhesive layer 11 can be used. Among these, a styrene block elastomer is preferable, and a styrene-olefin-styrene block copolymer elastomer is particularly preferable. As described above, in a case where an elastomer containing styrene is used as a monomer component, adhesiveness of the second layer 17 to the pressure sensitive adhesive layer 11 can be improved. Accordingly, it is possible to accurately suppress or prevent adhesive residues from being generated on the resin substrate 21 in the step [4].

In addition, in addition to the adhesive resin, the second layer 17 preferably contains a non-adhesive resin as a constituent material. Since the non-adhesive resin exhibits excellent affinity with the polyolefin contained in the first layer 16 and having a melting point of 150° C. or higher, adhesiveness between the first layer 16 and the second layer 17 can be improved. Accordingly, in the step [4], in a case of peeling off the protective film 10 from the resin substrate 21, it is possible to accurately suppress or prevent peeling between the first layer 16 and the second layer 17.

Examples of the non-adhesive resin include polyolefin, polyester, polyurethane, silicone resin, polyamide, polyimide, polyvinyl chloride, and polycarbonate. These maybe used alone or in combination of two or more kinds thereof. Among these, polyolefin is preferable, and a polyolefin having a melting point of 150° C. or higher is more preferable. In this manner, the above-described effects can be exhibited more significantly.

In addition, the polyolefin is not particularly limited, examples thereof include a polypropylene homopolymer, a polyethylene homopolymer, a propylene-ethylene copolymer, an ethylene-vinyl acetate copolymer, an ethylene-ethyl acrylate copolymer, and an ethylene-methyl methacrylate copolymer. These may be used alone or in combination of two or more kinds thereof. Among these, a polypropylene homopolymer is preferable. In this manner, it is possible to easily and inexpensively obtain a polyolefin. In addition, it is possible to impart transparency to the second layer 17. Accordingly, in a case where the first layer 16 and the pressure sensitive adhesive layer 11 also have transparency, the protective film 10 can have transparency. Therefore, in a case of, in the step [1], attaching the protective film 10 to the resin substrate 21, it is possible to visually confirm whether dirt such as dust is present between the protective film 10 and the resin substrate 21. Accordingly, it is possible to reliably prevent a laminate 100 having the dirt therebetween from being transitioned to the step [2] and the subsequent steps. As the result, the yield of a lens 200 for sunglasses to be obtained can be improved.

Further, examples of the polyolefin having a melting point of 150° C. or higher include the above-described polyolefins having a melting point of 150° C. or higher. In addition, the melting point of the polyolefin having a melting point of 150° or higher is preferably in a range of 155° C. to 170° C.

Further, the copolymer may be either a block copolymer or a random copolymer. Here, since the polyolefin having a melting point of 150° C. or higher alone does not have adhesion, the polyolefin having a melting point of 150° C. or higher alone is generally used as the non-adhesive resin. However, for example, a propylene-ethylene random copolymer (melting point: 151° C.) has adhesion so as to be used as the adhesive resin.

From the above, in a case where the second layer 17 contains a non-adhesive resin, an elastomer and a polyolefin having a melting point of 150° C. or higher are preferable as a combination of the adhesive resin and the non-adhesive resin. With such a combination, it is possible to accurately suppress or prevent peeling between the pressure sensitive adhesive layer 11 and the second layer 17 and between the first layer 16 and the second layer 17. Accordingly, the residual ratio of an area where the pressure sensitive adhesive layer 11 remains can be reliably set to be 5% or less. As a result, in the step [4], it is possible to peel off the protective film 10 (pressure sensitive adhesive layer 11) from the resin substrate 21 in a state of accurately suppressing or preventing the whiskers from remaining on the cut surface of the resin substrate 21.

Further, the average thickness of the second layer 17 is preferably in a range of 10 μm to 60 μm and more preferably in a range of 10 μm to 25 μm. In this manner, the above-described functions as the second layer 17 can be reliably exhibited.

Further, each layer of the pressure sensitive adhesive layer 11 and the base material layer 15 (the first layer 16 and the second layer 17) in the above-described protective film 10 may contain various additives such as an antioxidant, a light stabilizer, and an antistatic agent in addition to the above-described constituent materials.

In addition, an intermediate layer containing the above-described additives may be formed between each layer thereof.

Further, the above-described protective film 10 may be produced using any method. For example, the protective film 10 can be produced as follows, using a co-extrusion method.

Specifically, three extruders are prepared. The constituent materials of the pressure sensitive adhesive layer 11, the first layer 16, and the second layer 17 are respectively stored in these extruders, and then these constituent materials are extruded in a melted or softened state. In this manner, from a co-extrusion T die, a laminate in a melted or softened state, in which these constituent materials are laminated in layers, is supplied to a sheet molding unit configured of a plurality of cooling rolls. Thereafter, the laminate is cooled in this sheet supply unit, thereby producing the protective film 10.

Hereinbefore, the protective film of the present invention has been described, but the present invention is not limited thereto. For example, each layer constituting the protective film may be replaced with a layer which is capable of exhibiting the same function and has an optional configuration.

In the embodiment, the case where the protective film of the present invention is used by being attached to the resin substrate at the time of performing heat bending of the resin substrate of a lens for sunglasses has been described, but the embodiment is not limited thereto. The protective film of the present invention can be applied to the heat bending of the resin substrate in a lens for sunglasses, and can also be used for heat bending of the resin substrate in a lens of goggles, a visor of helmets, and the like.

EXAMPLES

Hereinafter, the present invention will be described in detail based on examples. Further, the present invention is not limited to these examples.

1. Preparation of Raw Materials

First, raw materials used for production of the protective films of each of Examples and Comparative Examples are as follows.

«Non-Adhesive Resin»
<Polyolefin Having Melting Point of 150° C. or Higher>
Homo polypropylene having melting point of 167° C. (h-PP, manufactured by Japan Polypropylene Corporation, "NOVATEC EA9FTD", MFR=0.4 g/10 min)
Homo polypropylene having melting point of 158° C. (h-PP, manufactured by Sumitomo Chemical Co., Ltd., "NOBLEN FS2011DG2", MFR=2.5 g/10 min)
Block polypropylene having melting point of 158° C. (propylene-ethylene block copolymer) (b-PP, manufactured by Japan Polypropylene Corporation, "NOVATEC EC9GD", MFR=0.5 g/10 min)
<Polyolefin Having Melting Point of Lower than 125° C.>
Linear low-density polyethylene having melting point of 121° C. (LLDPE, manufactured by Ube-Maruzen Polyethylene Co., Ltd., "UMERIT 2525F", MFR=2.5 g/10 min)
Linear low-density polyethylene having melting point of 114° C. (LLDPE, manufactured by Ube-Maruzen Polyethylene Co., Ltd., "UMERIT 1520F", MFR=2.0 g/10 min)

<Polyolefin Having Melting Point of 125° C. or Higher and Lower than 150° C.>
High-density polyethylene having melting point of 132° C. (HDPE, manufactured by Prime Polymer Co., Ltd., "HI-ZEX 3300F", MFR=1.1 g/10 min)
Linear low-density polyethylene having melting point of 114° C. (LLDPE, manufactured by Ube-Maruzen Polyethylene Co., Ltd., "UMERIT 1520F", MFR=2.0 g/10 min)

«Adhesive Resin»
<Elastomer>
Styrene-ethylene-butylene-styrene block copolymer (SEBS, manufactured by Asahi Kasei Corporation, "TUFTEC H1221")
Styrene-isoprene-styrene copolymer (SIS, manufactured by KURARAY CO., LTD., "HYBRAR 7127")
Styrene-ethylene-butylene-ethylene block copolymer (SEBC, manufactured by JSR Corporation, "DYNARON 4600P")
Hydrogenated styrene-butadiene random copolymer (HSBR, manufactured by JSR Corporation, "DYNARON 1320P")
α-Olefin/polypropylene copolymer elastomer (manufactured by Mitsui Chemicals, Inc., "TAFMER PN2060")
Ethylene-propylene-diene terpolymer (EPDM, manufactured by Sumitomo Chemical Co., Ltd., "ESPRENE 301A")
<Olefin-Based Material>
Ethylene-methyl methacrylate copolymer having melting point of 106° C. (EMMA, manufactured by Sumitomo Chemical Co., Ltd., "ACRYFT WD203-1")
Ethylene-methacrylic acid copolymer having melting point of 105° C. (EMAA, manufactured by DOW-MITSUI POLYCHMICALS, "NUCREL AN4214C")
Ethylene-methyl acrylate copolymer having melting point of 90° C. (EMA, manufactured by Japan Polyethylene Corporation, "REXPEARL EB330H")
Functional group-introduced polyolefin having melting point of 90° C. (manufactured by Mitsui Chemicals, Inc., "ADMER PF508")
Ethylene-vinyl acetate copolymer having melting point of 78° C. (EVA, manufactured by Ube-Maruzen Polyethylene Co., Ltd., "Ube Polyethylene V322")
<Polyolefin Having Melting Point of 150° C. or Higher>
Random polypropylene copolymer having melting point of 151° C. (r-PP, manufactured by Japan Polypropylene Corporation, "WINTEC WMH02", MFR=20 g/10 min)
<Polyolefin Having Melting Point of 125° C. or Higher and Lower than 150° C.>
Random polypropylene copolymer having melting point of 131° C. (r-PP, manufactured by Sumitomo Chemical Co., Ltd., "NOBLEN S131", MFR=1.3 g/10 min)

2. Production of Protective Film

Example 1

[1] First, in a case of formation of a pressure sensitive adhesive layer (innermost layer), LLDPE, as a polyolefin, having a melting point of 121° C. and SEBS as an elastomer were kneaded such that the content of the SEBS was set to 10 wt %, thereby preparing a pressure sensitive adhesive layer forming material (resin composition).

[2] Next, in a case of formation of a second layer (intermediate layer) including a base material layer, SEBS as an adhesive resin and h-PP, as a non-adhesive resin, having a melting point of 167° C. were kneaded such that the content of the SEBS was set to 20 wt %, thereby preparing a second layer forming material (resin composition).

[3] Next, the prepared pressure sensitive adhesive layer forming material, the prepared second layer forming material, and h-PP, as a polyolefin forming a first layer (outermost layer) and having a melting point of 150° C. or higher, having a melting point of 167° C. were respectively stored in three extruders.

[4] Next, these forming materials were extruded in a melted state from the three extruders. In this manner, a laminate in a melted state in which these forming materials were laminated in layers was obtained from a co-extrusion T die. Thereafter, a protective film of Example 1 was obtained by cooling this laminate.

Examples 2 to 15 and Comparative Examples 1 to 6

Each protective film of Examples 2 to 15 and Comparative Examples 1 to 6 was obtained in the same manner as in Example 1, except that the kind of polyolefin, kind of elastomer, and content of elastomer contained in the prepared pressure sensitive adhesive layer forming material used in the step [1], the kind of adhesive resin, kind of non-adhesive resin, and content of adhesive resin contained in the prepared second layer forming material used in the step [2], and at least one of the kinds of polyolefins having a melting point of 150° C. or higher used in the step [3] were respectively changed as listed in Table 1.

3. Evaluation

The protective films of each of Examples and Comparative Examples were evaluated according to the following method.

<1> Residue Test of Pressure Sensitive Adhesive Layer on Attaching Substrate

First, the protective films of each of Examples and Comparative Examples were respectively interposed between attaching substrates (manufactured by Sumitomo Bakelite Co., Ltd., "ECK 100SUU", arithmetic average roughness Ra of matte surface: 10 μm) which were formed of polycarbonate and had a dimension of 30 cm in length×30 cm in width×2.0 mm in thickness. At this time, the protective film was interposed so that the matte surface of the attaching substrate was positioned on the protective film side. In this manner, the protective film was interposed between the two attaching substrates (first attaching substrate and second attaching substrate) to obtain an interposing body. By pressing the interposing body with a roll under a condition of a load of 1 kg/cm², the protective film was attached to the attaching substrate such that a matte surface of one attaching substrate (first attaching substrate) was positioned on the pressure sensitive adhesive layer side of the protective film.

The polycarbonate forming the attaching substrate was an aromatic polycarbonate-based resin obtained by an interfacial polycondensation reaction of bisphenol A and phosgene. The aromatic polycarbonate-based resin was sheeted by extrusion molding to obtain a molded sheet. Thereafter, a matte pattern was applied to a surface of the obtained molded sheet by mold transfer to obtain the attaching substrate.

Next, the interposing body was heated at 145° C. for 30 minutes while the protective film was interposed between the attaching substrates. Thereafter, the attaching substrate (first attaching substrate) on the pressure sensitive adhesive layer side was peeled off at 25° C., a peeling angle of 90°, and a pulling speed of 1,000 mm/min.

After that, in a case of viewing the surface (matte surface) of the first attaching substrate in a plan view, a residual ratio of the pressure sensitive adhesive layer was obtained from a proportion of, in the surface of the first attaching substrate, an area where the pressure sensitive adhesive layer remained and the whole area where the pressure sensitive adhesive layer was attached (in a case where the size of the pressure sensitive adhesive layer in plan view was the same as the size (30 cm in length×30 cm in width) of the first attaching substrate in plan view, the whole area of the surface of the first attaching substrate).

<2> Evaluation of Presence or Absence of Whiskers Attached on Resin Substrate

First, resin substrates (manufactured by Sumitomo Bakelite Co., Ltd., "P1352") formed by interposing a polarizer between two polycarbonate substrates (polycarbonate layers) were respectively prepared for the protective films of each of Examples and Comparative Examples. Both surfaces of the resin substrate were interposed between the protective films to obtain an interposing body. Next, by pressing the interposing body with a roll under a condition of a load of 0.5 kg/cm², the protective films were attached to both surfaces of the resin substrate to obtain a laminate.

Next, after storing the laminate under conditions of a temperature of 50° C. and a time of 12 hr, the laminate, that is, the resin substrate having the protective film attached on both surfaces was punched in the thickness direction. In this manner, the laminate was formed into a circular shape in a plan view.

Next, after peeling off the two protective films from the laminate, and the presence or absence of whiskers (pressure sensitive adhesive layer) remained on the punched surface (cut surface) of the resin substrate 21 was visually observed and evaluated based on the following evaluation criteria. That is, a case where no whiskers remained on the cut surface was evaluated as A, a case where some whiskers remained on the cut surface was evaluated as B, and a case where whiskers clearly remained on the cut surface was evaluated as C.

<3> Evaluation of Presence or Absence of Orange Peel Formed on Surface of Resin Substrate First, resin substrates (manufactured by Sumitomo Bakelite Co., Ltd., "P1352") formed by interposing a polarizer between two polycarbonate substrates (polycarbonate layers) were respectively prepared for the protective films of each of Examples and Comparative Examples. Both surfaces of the resin substrate were interposed between the protective films to obtain an interposing body. Next, by pressing the interposing body with a roll under a condition of a load of 0.5 kg/cm², the protective films were attached to both surfaces of the resin substrate to obtain a laminate.

Next, after storing the laminate under conditions of a temperature of 50° C. and a time of 12 hr, the laminate, that is, the resin substrate having the protective film attached on both surfaces was punched in the thickness direction. In this manner, the laminate was formed into a circular shape in a plan view.

Next, using a REMA molding machine with a mold (manufactured by REMA, "CR-32 type"), the laminate which had been formed into a circular shape was subjected to heat bending while being heated.

Next, after peeling off the two protective films from the laminate, and the presence or absence of orange peel (unevenness) formed on an attaching surface (peeled surface) of the resin substrate 21 was visually observed and evaluated based on the following evaluation criteria. That is, a case where no orange peel was formed on the peeled surface was evaluated as A and a case where orange peel was formed on the peeled surface was evaluated as C.

<4> Evaluation of Adhesive Force Before Protective Film Had Undergone Heat History First, resin substrates (manufactured by Sumitomo Bakelite Co., Ltd., "P1352") formed by interposing a polarizer between two polycarbonate substrates (polycarbonate layers) were respectively prepared for the protective films of each of Examples and Comparative Examples. Both surfaces of the resin substrate were interposed between the protective films to obtain an interposing body. Next, by pressing the interposing body with a roll under a condition of a load of 0.5 kg/cm², the protective films were attached to both surfaces of the resin substrate to obtain a laminate.

Next, after storing the laminate under conditions of a temperature of 50° C. and a time of 12 hr, a peel strength $T_1$ between the polycarbonate substrate and the protective film was measured in conformity with JIS C-6481: 1996.

<5> Evaluation of Adhesive Force After Protective Film Had Undergone Heat History First, resin substrates (manufactured by Sumitomo Bakelite Co., Ltd., "P1352") formed by interposing a polarizer between two polycarbonate substrates (polycarbonate layers) were respectively prepared for the protective films of each of Examples and Comparative Examples. Both surfaces of the resin substrate were interposed between the protective films to obtain an interposing body. Next, by pressing the interposing body with a roll under a condition of a load of 0.5 kg/cm², the protective films were attached to both surfaces of the resin substrate to obtain a laminate.

Next, after storing the laminate under conditions of a temperature of 150° C. and a time of 5 min, a peel strength $T_2$ between the polycarbonate substrate and the protective film was measured in conformity with JIS C-6481: 1996.

The evaluation results of the protective films of each of Examples and Comparative Examples, which had been obtained in the above-described manner, are listed in Table 1.

TABLE 1

| | | | Example | | | | | | |
|---|---|---|---|---|---|---|---|---|---|
| | | | 1 | 2 | 3 | 4 | 5 | 6 | 7 |
| Base material layer | First layer (outmost layer) | Polyolefin having melting point of 150° C. or higher | h-PP | h-PP | h-PP | h-PP | h-PP | h-PP | h-PP |
| | | Melting point of polyolefin [° C.] | 167 | 167 | 167 | 158 | 158 | 167 | 167 |
| | Second layer (intermediate layer) | Adhesive resin A | SEBS | SEBS | SIS | SEBC | HSBR | α-olefin copolymer | LLDPE |
| | | Non-adhesive resin B | h-PP | b-PP | h-PP | h-PP | h-PP | h-PP | h-PP |
| | | Melting point of non-adhesive resin [° C.] | 167 | 158 | 167 | 167 | 167 | 167 | 167 |
| | | Component ratio of A:B [wt %] | 20:80 | 20:80 | 20:80 | 20:80 | 20:80 | 30:70 | 25:75 |
| Pressure sensitive adhesive layer (innermost layer) | | Polyolefin C | LLDPE | LLDPE | LLDPE | LLDPE | LLDPE | LLDPE | LLDPE |
| | | Melting point of polyolefin [° C.] | 121 | 121 | 121 | 114 | 114 | 114 | 114 |
| | | Elastomer D | SEBS | SEBS | SIS | SEBC | HSBR | α-olefin copolymer | SEBS |
| | | Component ratio of C:D [wt %] | 90:10 | 90:10 | 90:10 | 90:10 | 90:10 | 90:10 | 90:10 |
| Evaluation | Residue test residual ratio of pressure sensitive adhesive layer [%] | | 0 | 0 | 0 | 0 | 0 | 2 | 0 |
| | Presence or absence of whiskers attached on punched surface | | A | A | A | A | A | A | A |
| | Presence or absence of orange peel formed on peeled surface | | A | A | A | A | A | A | A |
| | Peel strength $T_1$ [N/25 mm] | | 0.20 | 0.20 | 0.30 | 0.10 | 0.40 | 0.10 | 0.20 |
| | Peel strength $T_2$ [N/25 mm] | | 0.30 | 0.40 | 0.40 | 0.50 | 0.50 | 0.60 | 0.40 |

| | | | Example | | | | | | |
|---|---|---|---|---|---|---|---|---|---|
| | | | 8 | 9 | 10 | 11 | 12 | 13 | 14 |
| Base material layer | First layer (outmost layer) | Polyolefin having melting point of 150° C. or higher | h-PP | h-PP | h-PP | h-PP | h-PP | h-PP | r-PP |
| | | Melting point of polyolefin [° C.] | 167 | 167 | 167 | 167 | 167 | 167 | 151 |
| | Second layer (intermediate layer) | Adhesive resin A | EMMA | EMAA | EMA | r-PP | EPDM | r-PP | ADMER PF508 |
| | | Non-adhesive resin B | h-PP | h-PP | h-PP | — | h-PP | — | — |
| | | Melting point of non-adhesive resin [° C.] | 167 | 167 | 167 | (151)* | 167 | (151)* | (90)* |
| | | Component ratio of A:B [wt %] | 50:50 | 50:50 | 50:50 | 100 | 20:80 | 100 | 100 |

TABLE 1-continued

| | | | | | | | | | |
|---|---|---|---|---|---|---|---|---|---|
| Pressure sensitive adhesive layer (innermost layer) | | Polyolefin C | EMAA | EMAA | EMA | LLDPE | LLDPE | LLDPE | LLDPE |
| | | Melting point of polyolefin [° C.] | 106 | 105 | 90 | 114 | 114 | 121 | 121 |
| | | Elastomer D | SEBS | SEBS | SEBS | SEBS | SEBS | SEBS | SEBS |
| | | Component ratio of C:D [wt %] | 95:5 | 95:5 | 95:5 | 90:10 | 90:10 | 90:10 | 90:10 |
| Evaluation | Residue test residual ratio of pressure sensitive adhesive layer [%] | | 2 | 1 | 1 | 3 | 2 | 2 | 5 |
| | Presence or absence of whiskers attached on punched surface | | A | A | B | A | A | A | B |
| | Presence or absence of orange peel formed on peeled surface | | A | A | A | A | A | A | A |
| | Peel strength $T_1$ [N/25 mm] | | 1.00 | 1.00 | 1.00 | 0.20 | 0.20 | 0.20 | 1.00 |
| | Peel strength $T_2$ [N/25 mm] | | 2.50 | 2.50 | 2.50 | 0.30 | 1.00 | 0.50 | 3.00 |

| | | | Example | Comparative Example | | | | | |
|---|---|---|---|---|---|---|---|---|---|
| | | | 15 | 1 | 2 | 3 | 4 | 5 | 6 |
| Base material layer | First layer (outmost layer) | Polyolefin having melting point of 150° C. or higher | b-PP | h-PP | h-PP | h-PP | h-PP | h-PP | h-PP |
| | | Melting point of polyolefin [° C.] | 158 | 167 | 167 | 167 | 167 | 167 | 167 |
| | Second layer (intermediate layer) | Adhesive resin A | ADMER PF508 | — | — | — | — | SEBS | SEBS |
| | | Non-adhesive resin B | — | — | LLDPE | h-PP | EVA | h-PP | h-PP |
| | | Melting point of non-adhesive resin [° C.] | (90)* | — | 121 | 158 | 78 | 167 | 167 |
| | | Component ratio of A:B [wt %] | 100 | — | 0:100 | 0:100 | 0:100 | 20:80 | 20:80 |
| Pressure sensitive adhesive layer (innermost layer) | | Polyolefin C | LLDPE | LLDPE | LLDPE | LLDPE | LLDPE | HDPE | r-PP |
| | | Melting point of polyolefin [° C.] | 114 | 121 | 121 | 121 | 121 | 132 | 131 |
| | | Elastomer D | SEBS | SEBS | SEBS | SEBS | SEBS | SEBS | SEBS |
| | | Component ratio of C:D [wt %] | 90:10 | 90:10 | 90:10 | 90:10 | 90:10 | 90:10 | 90:10 |
| Evaluation | Residue test residual ratio of pressure sensitive adhesive layer [%] | | 5 | 20 | 20 | 20 | 30 | 80 | 0 |
| | Presence or absence of whiskers attached on punched surface | | B | C | C | C | C | C | B |
| | Presence or absence of orange peel formed on peeled surface | | A | A | A | A | A | C | C |
| | Peel strength $T_1$ [N/25 mm] | | 1.00 | 0.20 | 0.20 | 0.20 | 5.00 | 0.01 | 0.20 |
| | Peel strength $T_2$ [N/25 mm] | | 3.00 | 0.30 | 5.00 | 0.30 | 10.00 | 3.00 | 0.50 |

*in Examples 10 and 13 to 15, the addition of the non-adhesive resin is omitted, and the melting point of the adhesive resin is shown in parentheses.

As listed in Table 1, in the protective films of each of Examples, since the polyolefin having a melting point of lower than 125° C. was contained as a main material in the pressure sensitive adhesive layer, and the residual ratio of an area where the pressure sensitive adhesive layer remained was set to 5% or less, the following effect was exhibited. That is, it was found that, even in a case of performing punching and heat bending of the resin substrate in the step [2] and step [3], the whiskers can be suppressed or prevented from remaining on the punched surface, the protective film can be peeled off from the resin substrate in the step [4], and a resin substrate subjected to punching and heat bending was obtained without forming orange peel on the attaching surface on which the protective film had been attached.

On the contrary, in the protective films of each of Comparative Examples, the melting point of the polyolefin contained in the pressure sensitive adhesive layer was 125° C. or higher, or the residual ratio of an area where the pressure sensitive adhesive layer remained was more than 5%. Due to this, by performing punching and heat bending of the resin substrate in the step [2] and step [3], in a case of peeling off the protective film from the resin substrate in the step [4], whiskers clearly remained on the punched surface or orange peel is formed on the attaching surface on which the protective film had been attached.

INDUSTRIAL APPLICABILITY

According to the present invention, it is possible to provide a protective film in which, at the time of performing heat bending of the resin substrate, the heat bending can be performed without forming unevenness on a surface of a resin substrate, and which, in a case of punching the resin substrate and then peeling off the protective film from the resin substrate, can accurately suppress or prevent a pressure sensitive adhesive layer from remaining on a cut surface which is formed by carrying out the punching. Therefore, the present invention has industrial applicability.

REFERENCE SIGNS LIST

10: protective film
11: pressure sensitive adhesive layer
15: base material layer
16: first layer
17: second layer
21: resin substrate
23: polarizer
24: coating layer
30: polycarbonate layer
100: laminate
200: lens for sunglasses

The invention claimed is:

1. A protective film for heat bending a resin substrate, comprising:
a base material layer; and
a pressure sensitive adhesive layer positioned on the base material layer and configured to be adhered to a resin substrate,
wherein the pressure sensitive adhesive layer includes a polyolefin having a melting point of lower than 125° C. as a main material, the base material layer includes a laminate having a first layer positioned on a side opposite to the pressure sensitive adhesive layer and comprising a polyolefin having a melting point of 150° C. or higher as a main material, and a second layer positioned on a side facing the pressure sensitive adhesive layer and comprising an elastomer as an adhesive resin and a polyolefin having a melting point of 150° C. or higher as a non-adhesive resin, the elastomer in the second layer of the laminate in the base material layer includes a styrene-olefin-styrene block copolymer. and a residual ratio of an area where the pressure sensitive adhesive layer remains is 5% or less when heating the protective film at 145° C. for 30 minutes in a state that the protective film is being interposed between two attaching substrates formed of polycarbonate and having a dimension of 30 cm in length×30 cm in width×2.0 mm in thickness, peeling off the attaching substrate on the side of the pressure sensitive adhesive layer under the conditions of a temperature of 25° C., a peeling angle of 90° and a pulling speed of 1,000 mm/min and viewing a surface of the attaching substrate in a plan view.

2. The protective film according to claim 1, wherein a melt flow rate of the polyolefin in the pressure sensitive adhesive layer, which is measured under the conditions of a heating temperature of 230° C. and a load of 2.16 kgf in conformity with HS K7210, is in a range of 0.5 g/10 min to 10.0 g/10.

3. The protective film according to claim 1, wherein the pressure sensitive adhesive layer includes an elastomer.

4. The protective film according to claim 3, wherein the elastomer in the pressure sensitive adhesive layer includes a styrene-olefin-styrene block copolymer.

5. The protective film according to claim 1, wherein the polyolefin in the second layer includes at least one of a polypropylene homopolymer and a propylene-ethylene copolymer.

6. The protective film according to claim 1, wherein a pair of protective films each comprising the protective film are respectively attached to both surfaces of the resin substrate.

7. The protective film according to claim 1, wherein a coating layer comprising a single layer or a laminate having at least one layer selected from the group consisting of a polycarbonate resin layer, a polyamide resin layer, and a cellulose resin layer is positioned on one surface or the other surface of the resin substrate, or a pair of coating layers each comprising the coating layer are respectively positioned on both surfaces of the resin substrate.

8. The protective film according to claim 1, wherein the resin substrate is subjected to the heat bending by press molding or vacuum molding.

9. The protective film according to claim 2, wherein the pressure sensitive adhesive layer includes an elastomer.

10. The protective film according to claim 9, wherein the elastomer in the pressure sensitive adhesive layer includes a styrene-olefin-styrene block copolymer.

11. The protective film according to claim 1, wherein the polyolefin in the second layer has the melting point in a range of 150° C. to 170° C.

12. The protective film according to claim 2, wherein a pair of protective films each comprising the protective film are respectively attached to both surfaces of the resin substrate.

13. The protective film according to claim 2, wherein a coating layer comprising a single layer or a laminate having at least one layer selected from the group consisting of a polycarbonate resin layer, a polyamide resin layer, and a cellulose resin layer is positioned on one surface or the other surface of the resin substrate, or a pair of coating layers each comprising the coating layer are respectively positioned on both surfaces of the resin substrate.

14. The protective film according to claim 2, wherein the resin substrate is subjected to the heat bending by press molding or vacuum molding.

15. The protective film according to claim 1, wherein the polyolefin in the second layer has the melting point in a range of 155° C. to 170° C.

16. The protective film according to claim 3, wherein a pair of protective films each comprising the protective film are respectively attached to both surfaces of the resin substrate.

17. The protective film according to claim 3, wherein a coating layer comprising a single layer or a laminate having at least one layer selected from the group consisting of a polycarbonate resin layer, a polyamide resin layer, and a cellulose resin layer is positioned on one surface or the other surface of the resin substrate, or a pair of coating layers each comprising the coating layer are respectively positioned on both surfaces of the resin substrate.

18. The protective film according to claim 3, wherein the resin substrate is subjected to the heat bending by press molding or vacuum molding.

19. The protective film according to claim 4, wherein a pair of protective films each comprising the protective film are respectively attached to both surfaces of the resin substrate.

20. The protective film according to claim 1, wherein the laminate in the base material layer is formed such that a wt % ratio of the adhesive resin and the non-adhesive resin in the second layer is in a range of 20:80 to 50:50.

* * * * *